(12) United States Patent
Zhang et al.

(10) Patent No.: US 7,333,160 B2
(45) Date of Patent: Feb. 19, 2008

(54) DISPLAY DEVICE INCLUDING RESIN FILM

(75) Inventors: Hongyong Zhang, Kanagawa (JP);
Shunpei Yamazaki, Tokyo (JP);
Satoshi Teramoto, Kanagawa (JP);
Yoshiharu Hirakata, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 10/458,648

(22) Filed: Jun. 9, 2003

(65) Prior Publication Data

US 2003/0210358 A1   Nov. 13, 2003

Related U.S. Application Data

(63) Continuation of application No. 10/143,331, filed on May 9, 2002, now Pat. No. 6,577,372, which is a continuation of application No. 09/912,092, filed on Jul. 23, 2001, now Pat. No. 6,404,479, which is a continuation of application No. 08/879,583, filed on Jun. 20, 1997, now Pat. No. 6,288,764.

(30) Foreign Application Priority Data

Jun. 25, 1996 (JP) ................... 8-185635
Aug. 13, 1996 (JP) ................... 8-232608
Sep. 27, 1996 (JP) ................... 8-277485

(51) Int. Cl.
*G02F 1/136* (2006.01)
*G02F 1/1345* (2006.01)

(52) U.S. Cl. ............... 349/43; 349/46; 349/152

(58) Field of Classification Search ............ 349/43, 349/46, 152, 42; 257/59, 72; 345/92
See application file for complete search history.

(56) References Cited

U.S. PATENT DOCUMENTS

| 4,457,589 | A |   | 7/1984 | Tamura et al. |
| 4,640,584 | A |   | 2/1987 | Tsubakimoto et al. |
| 5,108,650 | A |   | 4/1992 | Koden et al. |
| 5,108,651 | A |   | 4/1992 | Terashima et al. |
| 5,148,301 | A |   | 9/1992 | Sawatsubashi et al. |
| 5,155,612 | A |   | 10/1992 | Adachi et al. |
| 5,182,620 | A | * | 1/1993 | Shimada et al. ......... 257/72 |
| 5,300,446 | A |   | 4/1994 | Fujioka |
| 5,516,712 | A |   | 5/1996 | Wei et al. |
| 5,523,865 | A |   | 6/1996 | Furuta et al. |
| 5,583,534 | A | * | 12/1996 | Katakura et al. ......... 345/97 |
| 5,606,194 | A |   | 2/1997 | Lebrun et al. |
| 5,640,216 | A |   | 6/1997 | Hasegawa et al. |

(Continued)

FOREIGN PATENT DOCUMENTS

EP   0 402 170   12/1990

(Continued)

*Primary Examiner*—Huyen Ngo
(74) *Attorney, Agent, or Firm*—Fish & Richardson P.C.

(57) ABSTRACT

An electronic device having an active matrix liquid crystal device comprising a sealing layer with a region overlapping an insulating film formed over another insulating film, which extends beyond said insulating film and forms on a peripheral switching device, a region in contact with said another insulating film, and a region where said second insulating film is not formed over said another insulating film.

84 Claims, 10 Drawing Sheets

U.S. PATENT DOCUMENTS

| | | | |
|---|---|---|---|
| 5,644,373 A | 7/1997 | Furushima et al. | |
| 5,663,577 A | 9/1997 | Kwasnick et al. | |
| 5,684,555 A | 11/1997 | Shiba et al. | 349/110 |
| 5,686,328 A | 11/1997 | Zhang et al. | |
| 5,693,959 A * | 12/1997 | Inoue et al. | 257/66 |
| 5,721,601 A * | 2/1998 | Yamaji et al. | 349/138 |
| 5,726,720 A * | 3/1998 | Watanabe et al. | 349/43 |
| 5,731,600 A | 3/1998 | Codama et al. | |
| 5,739,549 A | 4/1998 | Takemura et al. | |
| 5,757,450 A | 5/1998 | Fujii et al. | |
| 5,777,701 A | 7/1998 | Zhang | |
| 5,828,429 A | 10/1998 | Takemura | |
| 5,834,327 A | 11/1998 | Yamazaki et al. | |
| 5,888,856 A | 3/1999 | Hamada | |
| 5,892,562 A | 4/1999 | Yamazaki et al. | |
| 5,898,204 A * | 4/1999 | Watanabe | 257/349 |
| 5,936,698 A | 8/1999 | Koyama | |
| 5,952,708 A * | 9/1999 | Yamazaki | 257/643 |
| 5,963,288 A | 10/1999 | Sato et al. | |
| 5,990,542 A | 11/1999 | Yamazaki | |
| 6,011,607 A | 1/2000 | Yamazaki et al. | |
| 6,037,017 A | 3/2000 | Kashiro | |
| 6,055,034 A | 4/2000 | Zhang et al. | |
| 6,057,900 A | 5/2000 | Ono et al. | 349/110 |
| 6,072,556 A | 6/2000 | Hirakata et al. | |
| 6,075,580 A | 6/2000 | Kouchi | |
| 6,128,052 A * | 10/2000 | Asaba et al. | 349/42 |
| 6,413,805 B1 | 7/2002 | Zhang et al. | |
| 6,498,369 B1 | 12/2002 | Yamazaki et al. | |
| 2004/0141140 A1 | 7/2004 | Zhang et al. | |

FOREIGN PATENT DOCUMENTS

| | | |
|---|---|---|
| JP | 64-049022 | 2/1989 |
| JP | 03-012635 | 1/1991 |
| JP | 03-058027 | 3/1991 |
| JP | 04 324 826 | 11/1992 |
| JP | 06-118404 | 4/1994 |
| JP | 06-138488 | 5/1994 |
| JP | 06-138491 | 5/1994 |
| JP | 06-186580 | 7/1994 |
| JP | 06-186588 | 7/1994 |
| JP | 06-258659 | 9/1994 |
| JP | 06-258661 | 9/1994 |
| JP | 06-258662 | 9/1994 |
| JP | 08-234215 | 9/1996 |

* cited by examiner

IMPLANTATION OF P IONS (HEAVY DOPING)

FIG. 2E

IMPLANTATION OF P IONS (LIGHT DOPING)

FIG. 3A

IMPLANTATION OF B IONS

PERIPHERAL DRIVING CIRCUIT
100

ACTIVE MATRIX CIRCUIT
200

PERIPHERAL DRIVING
CIRCUIT PORTION

ACTIVE MATRIX
CIRCUIT PORTION

DISPLAY DEVICE INCLUDING RESIN FILM

CROSS-REFERENCE TO RELATED APPLICATIONS

This application is a continuation application of and claims priority to U.S. application Ser. No. 10/143,331, filed May 9, 2002, now U.S. Pat. No. 6,577,372, which is a continuation of U.S. application Ser. No. 09/912,092, filed Jul. 23, 2001, now U.S. Pat. No. 6,404,479, which is a continuation of U.S. application Ser. No. 08/879,583, filed June 20, 1997, now U.S. Pat. No. 6,288,764.

BACKGROUND OF THE INVENTION

1. Field of the Invention

The present invention relates to a configuration of an active matrix type liquid crystal display integrated with a peripheral driving circuit.

2. Description of Related Art

Active matrix type liquid crystal displays have been known.

They have a configuration in which an active matrix circuit and a peripheral driving circuit for driving the same circuit are integrated on a glass substrate or quartz substrate.

In such a liquid crystal panel integrated with a peripheral driving circuit, a thin film semiconductor that forms thin film transistors provided in the peripheral driving circuit must be a crystalline silicon thin film. The reason for this is that the peripheral driving circuit must operate at a high speed.

Reliability is an important consideration for a liquid crystal panel integrated with a peripheral driving circuit as described above. Specifically, what is important for such a device is the stability of image display in relation to the environment where it is used.

Especially, a crystalline silicon film has a problem in that it is significantly susceptible to the variation of characteristics with time and the influence of the environment where it is used because of the high level of characteristics of itself.

Specifically, a problem arises in that it is affected by stresses exerted thereon during the fabrication and handling of a liquid crystal panel and by moisture that permeates into the liquid crystal panel.

Further, a liquid crystal panel integrated with a peripheral driving circuit is designed in an intention to minimize the surface area of regions unnecessary for screen display. For example, efforts are put in minimizing the surface area occupied by the peripheral driving circuit.

Meanwhile, in a liquid crystal display, an encapsulating material for enclosing liquid crystal, referred to as "sealing material" is provided at a peripheral portion to hold liquid crystal between a pair of substrates.

As an effort to minimize the surface area of regions unnecessary for screen display as described above, the surface area occupied by the sealing material must be also reduced. A configuration for this purpose is known in which a sealing material is provided on a peripheral driving circuit to minimize the surface area excluding pixels (referred to as "frame").

In the case of an active matrix type liquid crystal display integrated with a peripheral driving circuit, faults that occur in the peripheral driving circuit can be a problem.

Especially, the configuration in which a sealing material is provided on a peripheral driving circuit to minimize the surface area excluding pixels (referred to as "frame") is subjected to more faults at the peripheral driving circuit.

This problem occurs due to the following reasons. A sealing material includes a kind of spacer referred to as "filler" for maintaining a gap between substrates.

In general, a peripheral driving circuit is at a high level of integration. As a result, thin film transistors and wiring lines located directly under such fillers are subjected to a pressure from the fillers (it is assumed that this pressure can be locally quite high) and are hence vulnerable to line breakage and poor contact.

Meanwhile, a spherical substrate gap maintaining means referred to as "spacer" is used also in an active matrix region. However, since an active matrix region is at a lower level of integration, faults attributable to the presence of a spacer are not as problematic as in a peripheral driving circuit.

It is an object of the invention disclosed in this specification to provide a configuration for an active matrix type liquid crystal display incorporating a peripheral driving circuit, in which the surface area excluding the region of a pixel matrix circuit is minimized.

On the basis of the above-described configuration, it is another object of the invention to provide a configuration that prevents breakage of thin film transistors provided on a peripheral driving circuit due to a pressure exerted by a sealing material.

It is still another object of the invention to provide a configuration for an active matrix type liquid crystal display incorporating a peripheral driving circuit, which prevents thin film transistors from being adversely affected by a stress exerted thereon during the fabrication and handling of the liquid crystal panel and which prevents moisture from permeating into the liquid crystal panel.

SUMMARY OF THE INVENTION

Figure 1:
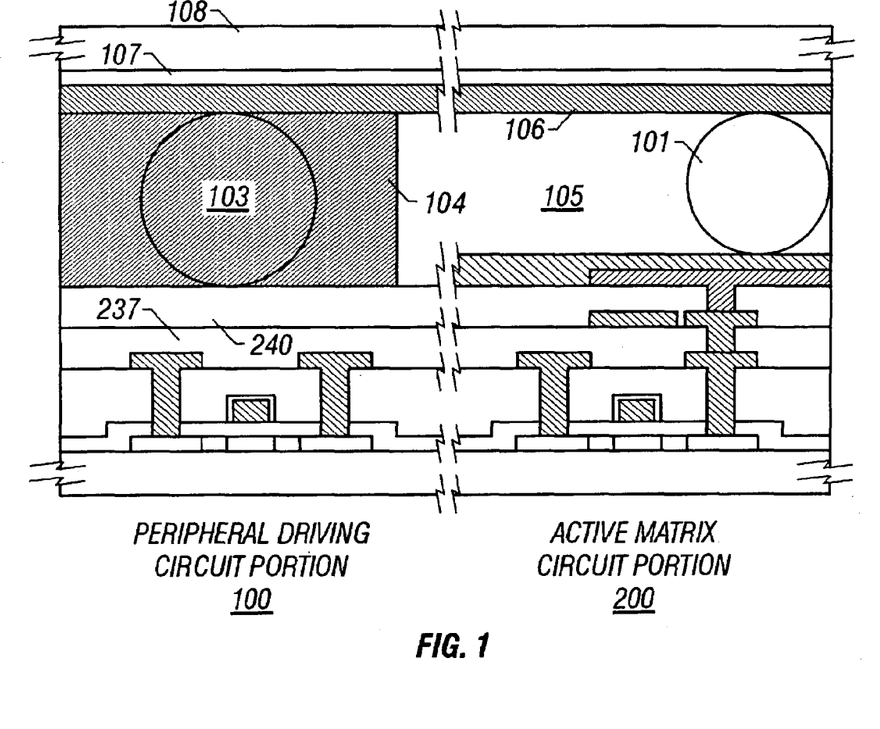
FIG. 1 is a partial sectional view of an active matrix type liquid crystal display which utilizes the present invention.

In order to solve the above-described problems, as a mode of carrying out the invention disclosed in this specification, there is provided an active matrix type liquid crystal display integrated with a peripheral driving circuit as shown in FIG. 1 having a configuration in which:

a sealing material 104 is provided on the peripheral driving circuit; and resin layers 237 and 240 are provided between the peripheral driving circuit and the sealing material.

The above-described configuration makes it possible to prevent a high pressure from being locally applied to the peripheral driving circuit by a filler 103 included in the sealing material 104, thereby preventing the breakage of the peripheral driving circuit.

Further, by providing the sealing material on the peripheral driving circuit, a configuration can be obtained in which the surface area excluding the pixel region is minimized.

In the above-described configuration, each of the resin layers are preferably formed as multilayered form. This is effective in moderating the pressure exerted thereon by the filler in the sealing material.

Further, it is advantageous to form an auxiliary capacitor in the active matrix region using the resin layers. This makes it possible to provide a capacitor having a required value in a pixel.

The thickness of the resin layers is preferably equal to greater than one-half of the diameter of a filler in the sealing material. This is a condition advantageous in preventing the pressure of a filler in the sealing material from being exerted on the peripheral driving circuit even if the filler sinks into the resin layers. Further, in order to moderate a pressure exerted on the peripheral driving circuit, a highly elastic material such as polyimide may be chosen for the resin layers. When the resin layers are formed as a multilayered form, it will be sufficient if the collective thickness is equal to or greater than one-half of the diameter of a filler in the sealing material.

Figure 6:
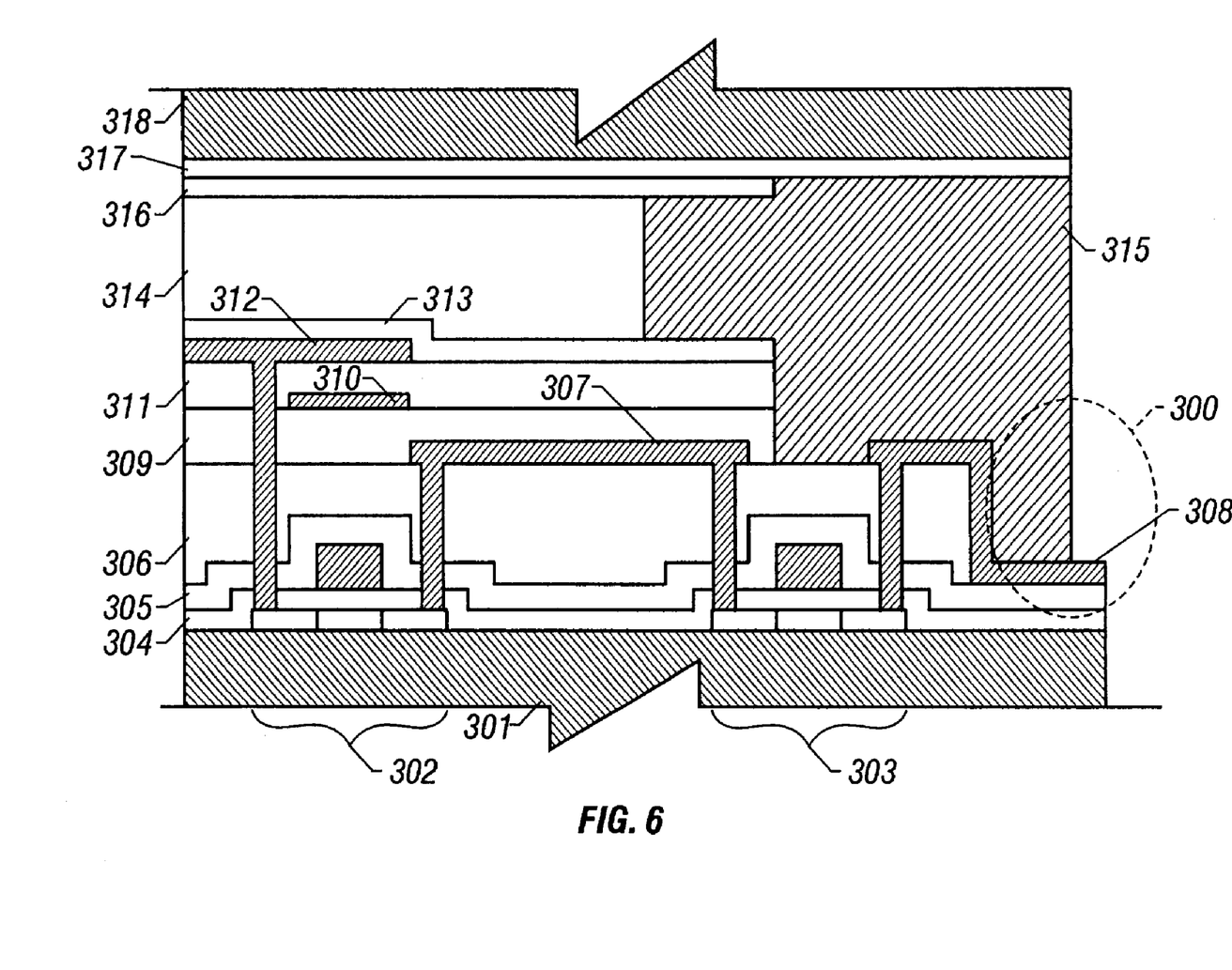
FIG. 6 is a partial sectional view of a liquid crystal panel which utilizes the present invention.

In order to solve the above-described problems, as specifically illustrated in FIG. 6, there is provided a configuration in which a liquid crystal material 314 is sandwiched and held between a pair of glass substrates 301 and 318, characterized in that:

an active matrix circuit (constituted by a thin film transistor indicated by 302) and a peripheral driving circuit (constituted by a thin film transistor indicated by 303) are provided on the surface of one of the substrates 301;

a resin material is provided on the peripheral driving circuit as interlayer insulating films 306, 309, and 311;

the liquid crystal material 314 is sealed with a sealing material 315;

the resin material and the sealing material partially overlap with each other; and the resin material is blocked from the outside by the sealing material.

In the context of the present invention, the term "a surface of a substrate" means a surface of a glass or quartz substrate and further a surface of a glass or quartz substrate having a silicon oxide film or a silicon nitride film (so-called inorganic film) formed thereon.

The use of the above-described configuration makes it possible to moderate a stress exerted on the peripheral driving circuit and to enhance sealing capability in the region indicated by 300 in FIG. 6.

Figure 7:
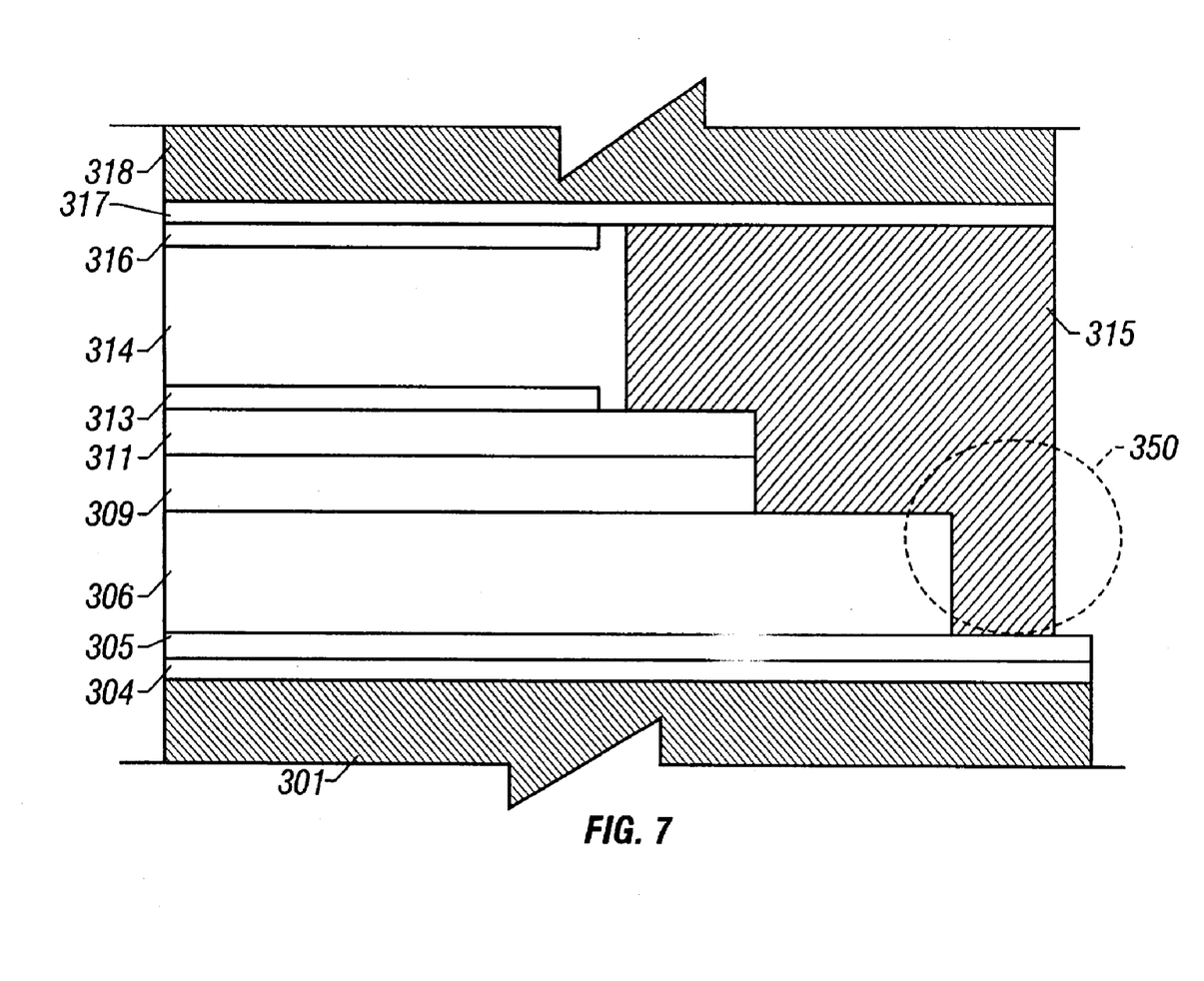
FIG. 7 is a partial sectional view of a liquid crystal panel which utilizes the present invention.

Especially, a high degree of adhesion can be achieved in the region indicated by 350 in FIG. 7 where the sealing material 315 is in contact with a silicon nitride film 305 which is an inorganic substance (inorganic film) except the region of wiring line 308. This makes it possible to achieve a high degree of adhesion in this region, thereby preventing external moisture from permeating.

In order to moderate a stress, the interlayer insulating films are preferably formed from polyimide resin. The sealing material is preferably formed from epoxy resin to enhance the sealing action further.

The interlayer insulating films can be formed without using polyimide resin.

For example, acrylic resin is also used to form the interlayer insulating film.

The active matrix type liquid crystal displays integrated with a peripheral circuit shown in FIGS. 1 and 6 are used for display devices of photographic apparatuses such as portable video movie apparatuses, portable personal computers, and various information terminals.

DETAILED DESCRIPTION OF PREFERRED EMBODIMENTS

A first embodiment of the present invention will now be described.

The present embodiment employs a configuration in which a sealing material is provided on a region where a peripheral driving circuit is located. Further, in order to prevent damage to the peripheral driving circuit caused by a stress exerted by a filler included in the sealing material, a configuration is employed in which a buffer layer made of polyimide is provided on the peripheral driving circuit.

FIG. 1 is a partial sectional view of an active matrix type liquid crystal display according to the present embodiment. FIG. 1 shows a configuration referred to as "peripheral driving circuit integrated type" having a structure in which a peripheral driving circuit 100 and an active matrix circuit 200 are integrated on the same substrate.

In the configuration shown in FIG. 1, a sealing portion indicated by 104 is provided over the peripheral driving circuit 100 and bounded by spacer 103. This sealing portion has a sealing function to prevent liquid crystal filled in a space 105 (a gap between the substrates) from leaking out.

The sealing portion 104 is formed from a resin material. The sealing portion 104 is formed by applying the resin material with a spinner, patterning it, and further baking it. Alternatively, it is formed using a printing process.

103 designates a filler which is required for maintaining an interval between the substrates. This filler is made of a resin material and has a cylindrical configuration. In the present embodiment, the resin material used for forming the sealing material 104 includes the filler 103 which is mixed therein in advance.

Resin layers 237 and 240 are provided under the sealing material 104. The resin layers are used as interlayer insulating films and dielectrics for an auxiliary capacitor. The resin layers have a function of moderating a pressure exerted on the peripheral driving circuit 100 by the filler in the sealing material in the region of the peripheral driving circuit 100.

FIGS. 2A through 2E, FIGS. 3A through 3D, and FIG. 4 illustrate fabrication steps to provide the configuration shown in FIG. 1. The fabrication steps described below relate to a configuration in which an n-channel type thin film transistor and a p-channel type thin film transistor are provided in a peripheral driving circuit and in which a p-channel type thin film transistor is provided in an active matrix circuit.

More particularly, in this configuration, a low concentration impurity region is provided in the n-channel type thin film transistor, and a high concentration impurity region is provided between a source/drain region and a channel formation region of the p-channel type thin film transistor.

Such a configuration makes it possible to suppress deterioration of the characteristics of the n-channel type thin film transistor of the peripheral driving circuit. Further, the active matrix circuit can be configured to achieve a low OFF current value and less variation of an ON current value.

FIGS. 2A through 2E, FIGS. 3A through 3D, and FIG. 4 illustrate fabrication steps. FIGS. 2A through 2E illustrate steps for fabricating the n-channel type thin film transistor (and the region around the same) provided in the peripheral driving circuit on the left side thereof. They illustrate steps for fabricating the thin film transistor (and the region around the same) provided in the active matrix region on the right side thereof.

Figure 2A:
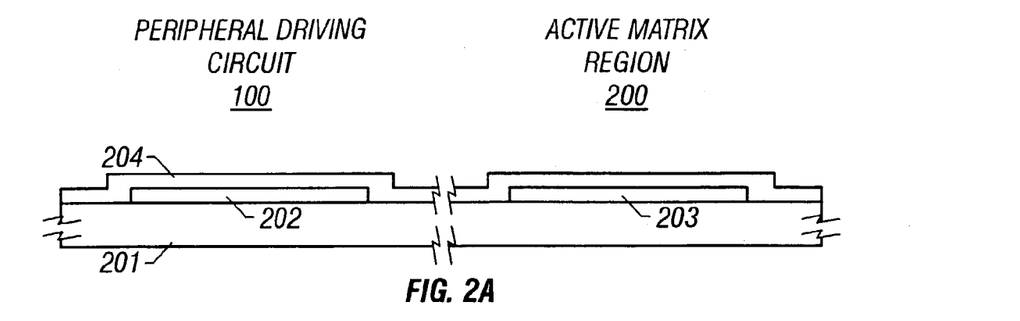
FIGS. 2A through 2E illustrate fabrication steps to provide the configuration shown in FIG. 1.

First, as shown in FIG. 2A, a backing film (not shown) is formed on a glass substrate 201. A silicon oxide film is used as the backing film. This backing film has a function of preventing diffusion of impurities from the glass substrate 201 and moderating a stress to the glass substrate.

Next, an amorphous silicon film (not shown) is formed on the backing film to a thickness of 500 Å using a plasma CVD process. Further, the amorphous silicon film is irradiated with laser beams to be crystallized into a crystalline silicon film. The crystalline silicon film may be obtained using a heating process or irradiation with intense beams.

This crystalline silicon film is patterned to form active layers indicated by 202 and 203 of thin film transistors. 202 designates an active layer of the n-channel type thin film transistor provided in the peripheral driving circuit 100. 203 designates an active layer of the p-channel type thin film transistor provided in the active matrix circuit 200.

Although only two thin film transistors are shown in the figures, tens of thousands to hundreds of thousands (or more) of thin film transistors are integrated in an actual configuration.

After forming the active layers, a plasma CVD process is performed to form a silicon oxide film having a thickness of 1000 Å as a gate insulating film 204. Thus, the state shown in FIG. 2A is achieved.

In the state shown in FIG. 2A, an aluminum film (not shown) is formed by a sputtering process to a thickness of 4000 Å in order to configure gate electrodes (and gate lines). This aluminum film includes 0.1% by weight of scandium.

Next, an anodic oxidation film (not shown) having dense film quality is formed to a thickness of 100 Å. This anodic oxidation is carried out using an ethylene glycol solution including 3% of tartaric acid as the electrolyte. This solution is used after being neutralized with aqueous ammonia.

The anodic oxidation film has a function of enhancing the adhesion of resist masks to be provided later. A silicon nitride film or a metal film may be used instead of the anodic oxidation film. Alternatively, an aluminum oxide film may be formed by means of plasma oxidization in an oxidizing atmosphere.

Next, the aluminum film is patterned using resist masks 205 and 206. This step forms aluminum patterns indicated by 207 and 208 which serve as bases for the gate electrodes. Thus, the state shown in FIG. 2B is achieved.

Figure 2B:
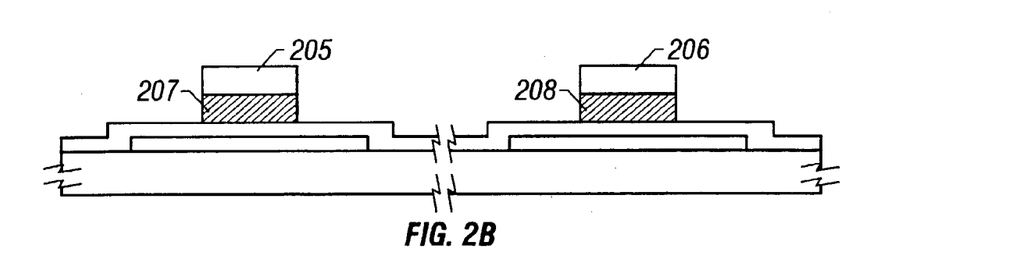

In the state shown in FIG. 2B, anodic oxidation is performed using the aluminum patterns 207 and 208 as anodes. This step forms porous anodic oxides (it is not appropriate to express them as "films") indicated by 211 and 212. The anodic oxides are grown a distance of 5000 Å.

This anodic oxidation is carried out using an aqueous solution including 3% of oxalic acid as the electrolyte.

Figure 2C:
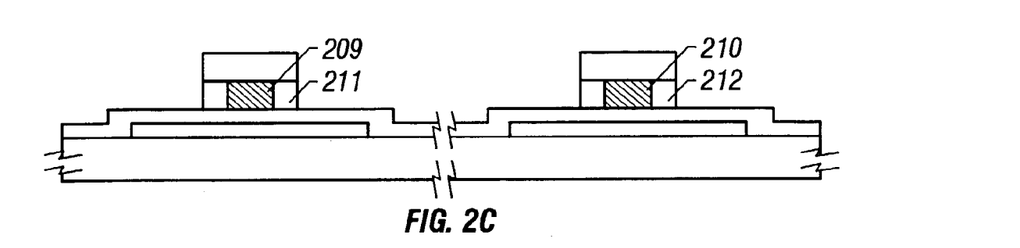

At this step, the presence of the resist masks 205 and 206 causes the anodic oxidation to selectively proceed on side surfaces of the aluminum patterns 207 and 208. The reason is that the presence of the resist masks 205 and 206 prevents the electrolyte from contacting the upper surfaces of the aluminum patterns 207 and 208. The patterns indicated by 209 and 210 here will become gate electrodes later. Thus, the state shown in FIG. 2C is achieved.

Figure 2D:
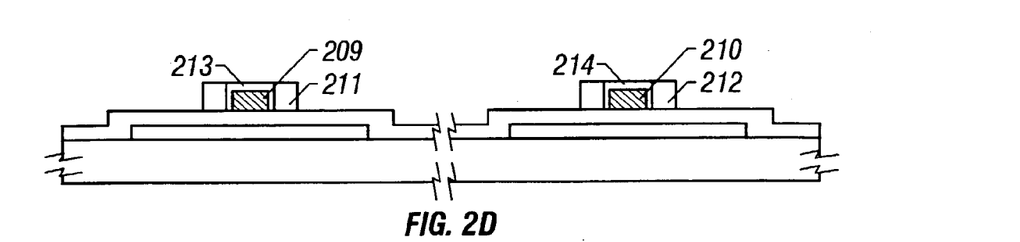

Next, the resist masks 205 and 206 are removed. Then, anodic oxidation films having dense film quality are formed. This anodic oxidation is performed using an ethylene glycol solution including 3% of tartaric acid and neutralized with aqueous ammonia as the electrolyte.

At this step, the electrolyte penetrates the porous anodic oxide films 211 and 212. Therefore, dense anodic oxidation films indicated by 213 and 214 are formed.

This step defines gate electrodes 209 and 210. The surfaces of these electrodes are covered by the dense anodic oxidation films 213 and 214. These electrodes and wiring lines extending therefrom serve as wiring lines for a first layer. Thus, the state shown in FIG. 2D is achieved.

Figure 2E:
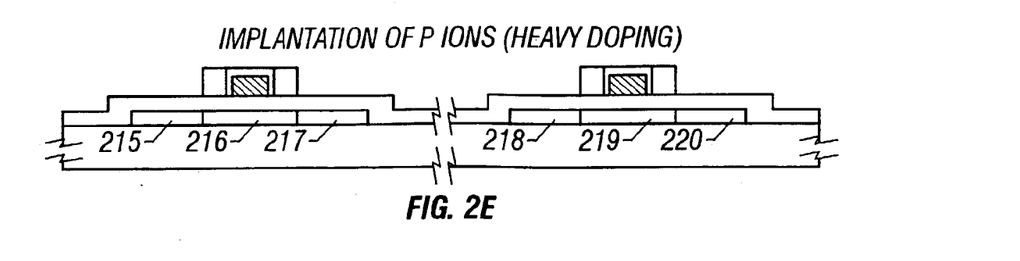

Next, the implantation of P (phosphorus) ions is carried out on the entire surface. At this step, P ions are implanted at a relatively high concentration in order to form source and drain regions (FIG. 2E).

At this step, P ions are implanted in regions 215, 217, 218, and 220. P ions are not implanted in regions 216 and 219.

Figure 3A:
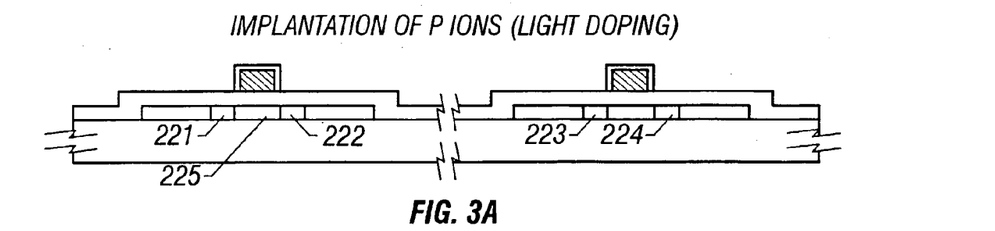
FIGS. 3A through 3D illustrate fabrication steps to provide the configuration shown in FIG. 1.

Then, the porous anodic oxide films 211 and 212 are removed. Thus, the state shown in FIG. 3A is achieved. In this state, P ions are implanted again. At this step, P ions are implanted in a dose less than that in the doping condition shown in FIG. 2E.

Thus, the regions indicated by 221, 222, 223, and 224 are formed as low concentration impurity regions, and a channel formation region 225 of the n-channel type transistor is defined (FIG. 3A).

Figure 3B:
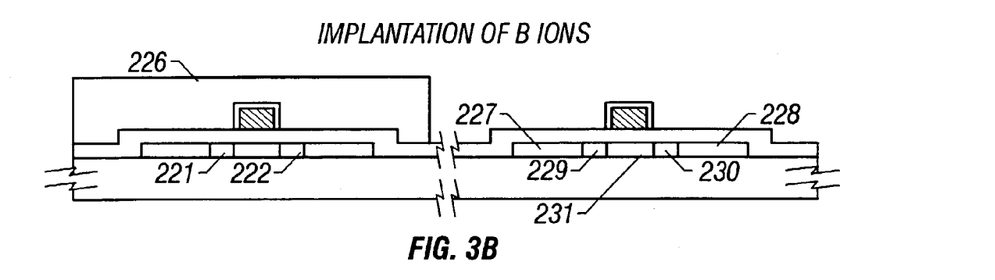

Next, the region where the n-channel type thin film transistor is to be formed is covered with a resist mask 226, and B ions are implanted in such a state. This step is performed on a condition that the regions indicated by 227 and 228 become the source and drain regions of the p-channel type thin film transistor.

At this step, the regions indicated by 227 and 228 become the source and drain regions. Further, the regions indicated by 229 and 230 are formed as regions which exhibit stronger p-type properties than those in the regions indicated by 227 and 228.

This is because the concentration of P elements included in the regions 229 and 230 is lower than that in the regions 227 and 228.

Specifically, more B elements are required in the regions 227 and 228 to neutralize P elements and, as a result, the regions 229 and 230 exhibit stronger p-type properties. Further, the region indicated by 231 is defined as the channel formation region of the p-channel type thin film transistor.

When the implantation of impurity ions is complete, the resist mask 226 is removed. Then, laser irradiation is performed to activate the implanted impurities and to anneal damage on the semiconductor films caused by the impact of the ions.

Figure 3C:
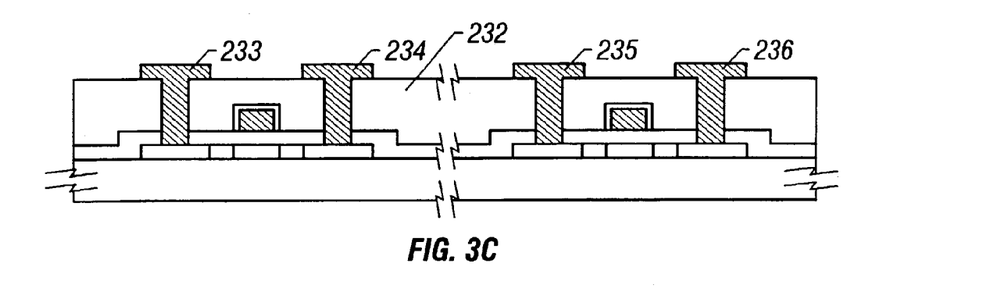

Next, a first interlayer insulating film 232 is formed. A silicon nitride film having a thickness of 4000 Å is formed here as the interlayer insulating film 232 using a plasma CVD process.

Then, contact holes are formed to form wiring lines (electrodes) 233 through 236 in a second layer. Thus, the state shown in FIG. 3C is achieved.

Figure 3D:
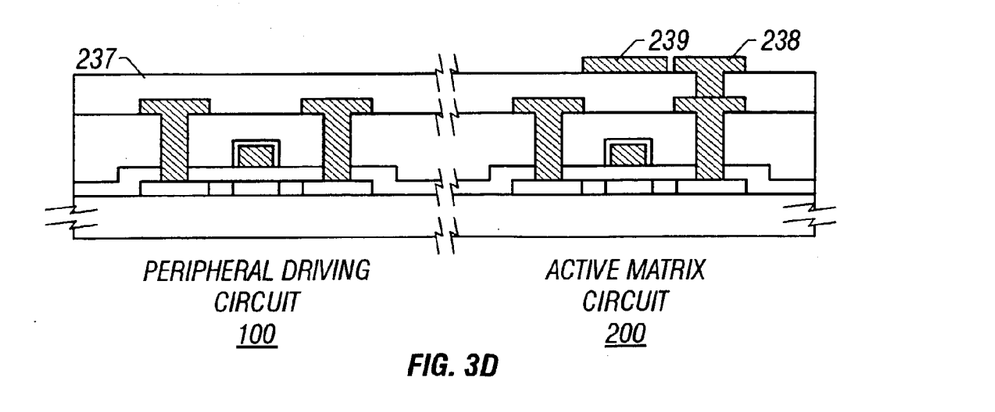

Next, a second interlayer insulating film 237 is formed. A resin film having a thickness of 15000 Å is formed here as the interlayer insulating film 237. It is formed using a spin coating process.

Next, a contact hole is formed to form a wiring line (electrode) 238 in a third layer. At the same time, a light shield film 239 for shading the thin film transistor provided in the active matrix circuit 200 is formed. This light shield film 239 forms an auxiliary capacitor in cooperation with a pixel electrode which is opposite thereto across a interlayer insulating film (resin film) to be formed later. Thus, the state shown in FIG. 3D is achieved.

Figure 4:
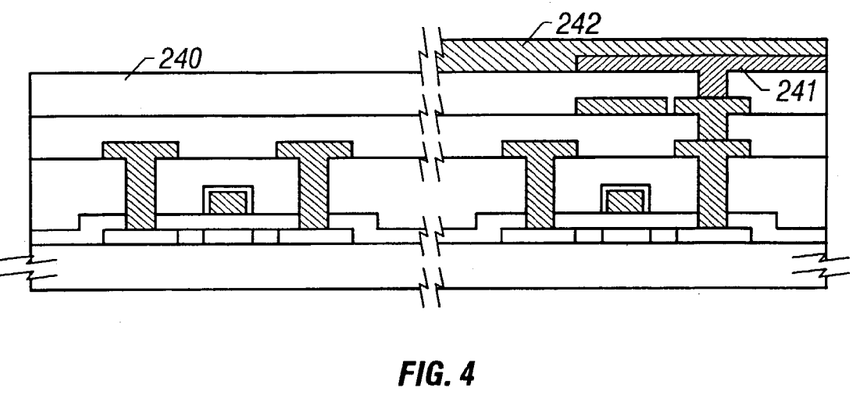
FIG. 4 illustrates a fabrication step to provide the configuration shown in FIG. 1.

Next, a third interlayer insulating film 240 is formed as shown in FIG. 4. A resin layer having a thickness of 5000 Å is formed here as the third interlayer insulating film 240 using a spin coating process. Then, a contact hole is formed to form a pixel electrode 241 using ITO.

In the present embodiment, an auxiliary capacitor is formed by the light shield film 239 and the pixel electrode which are provided so as to sandwich the third interlayer insulating film (resin film) 240.

Further, a rubbing film 242 is formed. The rubbing film 242 is made of resin and is formed using a printing process. In the present embodiment, the rubbing film is formed only in the region of the active matrix circuit. A rubbing process is carried out after the rubbing film 242 is formed.

Then, an opposite substrate 108 is provided as shown in FIG. 1. An opposite electrode 107 and a rubbing film 106 are formed on the opposite substrate 108. The opposite substrate 108 and the substrate shown in FIG. 4 is put together to complete the configuration shown in FIG. 1.

A second embodiment of the present invention will now be described.

The present embodiment is an example in which bottom-gate type thin film transistors are used in a liquid crystal display integrated with a peripheral driving circuit.

Figure 5:
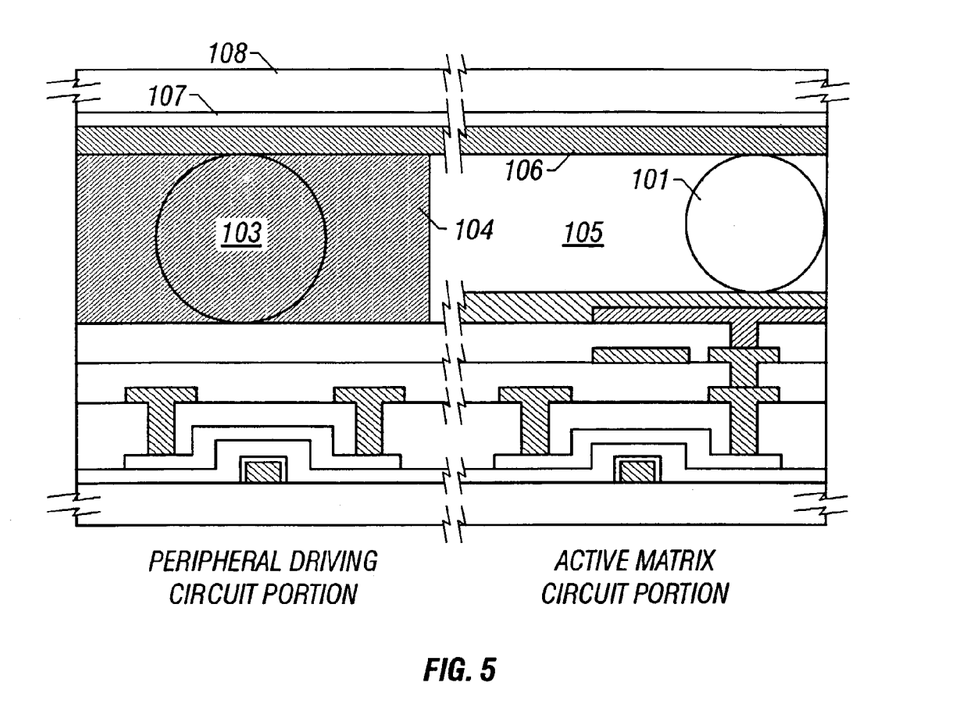
FIG. 5 is a partial sectional view of another active matrix type liquid crystal display which utilizes the present invention.

FIG. 5 is a sectional view corresponding to FIG. 1. The present embodiment is different from the configuration shown in FIG. 1 in the structure of the thin film transistors. The configuration is otherwise similar to that shown in FIG. 1.

A third embodiment of the present invention will now be described.

FIG. 6 schematically shows the configuration of the present embodiment. FIG. 6 is a schematic sectional view of an active matrix type liquid crystal display integrated with a peripheral driving circuit.

In FIG. 6, 301 and 318 designate a pair of glass substrates that constitute a liquid crystal panel. A liquid crystal material, an active matrix circuit, and a peripheral driving circuit for driving the active matrix circuit are provided in a gap between the pair of glass substrates.

302 designates a thin film transistor provided in the active matrix circuit portion. Although only one thin film transistor is provided in FIG. 6, in practice, thin film transistors are provided in a quantity at least equal to the number of pixels.

303 designates a thin film transistor provided in the peripheral driving circuit. Although only one thin film transistor 303 is provided in FIG. 6, in practice, a combination of p-channel type and n-channel type thin film transistors is provided in quantities required for forming a shift register circuit and a buffer circuit.

304 designates a interlayer insulating film. The gate insulating film 304 is constituted by a silicon oxide film. 305 designates a silicon nitride film that constitutes a first interlayer insulating film.

306 designates a resin interlayer film made of polyimide that constitutes the first interlayer insulating film in combination with the silicon nitride film 305. The resin interlayer film 306 made of polyimide is characterized in that its surface can be flattened.

307 designates a line which extends from the drain of the thin-film transistor 303 provided in the peripheral driving circuit and which is connected to the source of the thin film transistor 302 provided in the pixel matrix circuit.

308 designates a line connected to the source of the thin film transistor 303 provided in the peripheral driving circuit. This line 308 constitutes an external terminal of the liquid crystal panel.

309 designates a resin interlayer film made of polyimide that constitutes a second interlayer insulating film. 310 designates a light shield film made of titanium formed on the resin interlayer film 309 that constitutes the second interlayer insulating film. This light shield film 310 is provided to prevent the thin film transistor 302 from being irradiated with light.

311 designates a resin interlayer film made of polyimide that constitutes a third interlayer insulating film. 312 designates an ITO film that constitutes a pixel electrode. The ITO film 312 and the light shield film 310 form an auxiliary capacitor through the resin interlayer film 311. Such a configuration makes it possible to obtain a required auxiliary capacitor without reducing the aperture ratio.

The resin interlayer films 306, 309 and 311 can be formed without using polyimide resin. For example, acrylic resin is also used to form the interlayer insulating film.

313 designates an orientation film made of polyimide. This orientation film 313 exerts an orientation regulating force on liquid crystal 314 which is in contact therewith.

315 designates epoxy resin for sealing the liquid crystal material. The liquid crystal material 314 is held between the pair of glass substrates 318 and 301 by the epoxy resin 315.

The epoxy resin 315 includes glass fibers referred to as "filler" for maintaining the gap for the liquid crystal layer.

316 designates an orientation film made of polyimide provided on the opposite substrate (the substrate 318 is referred to as "opposite substrate"). 317 designates an opposite electrode.

The present embodiment is characterized in that the resin films 311, 309, and 306 that constitute interlayer films overlap the epoxy resin 315 that constitutes a sealing material in regions except a part of the epoxy resin 315.

This makes it possible to moderate a stress using the resin interlayer films made of polyimide and to prevent moisture from permeating from the outside of the panel using the epoxy resin that constitutes a sealing material.

The resin films indicated by 311, 309, and 306 are elastic and have a function of moderating a stress exerted externally.

However, they substantially have no function as a barrier to prevent the penetration of moisture because they absorb moisture.

On the other hand, the epoxy resin 315 that constitutes a sealing material is rigid and substantially has no function of moderating a stress, but it has a sufficient function of blocking moisture.

The use of the configuration disclosed in the present embodiment allows the effects of both of those components to be demonstrated.

Especially, the degree of sealing can be improved where the epoxy resin film and the polyimide resin film do not overlap each other at the part. Specifically, since epoxy resin and polyimide exhibit poor adhesion to each other, the arrangement to prevent them from overlapping each other at the part indicated by 300 makes it possible to enhance a sealing effect provided by epoxy resin in such a part.

It is thus possible to provide a function of sealing liquid crystal in the cell at the part indicated by 300 and to obtain a configuration that prevents impurities and dusts from entering the liquid crystal layer from the outside.

FIG. 7 is a sectional view of a region where the wiring line 308 is not present. As apparent from FIG. 7, in the region indicated by 350, a high degree of adhesion can be achieved between the sealing material 315 and the silicon nitride film 305 because they are in direct contact with each other.

The inventors understand that a quite high degree of adhesion can be achieved between epoxy resin and an inorganic material. It is therefore quite advantageous to enhance the sealing of the liquid crystal cell at the region indicated by 350 in FIG. 7.

Further, the structure of the thin film transistor is not limited to the top-gate type as in the present embodiment but may be a inverted staggered type as in the second embodiment.

A fourth embodiment of the present invention will now be described.

The present embodiment relates to an improvement on the configuration according to the third embodiment. Sealing may not be maintained in the region indicated by 300 in FIG. 6 because of a step which is a result of the presence of the wiring line 308.

Figure 8:
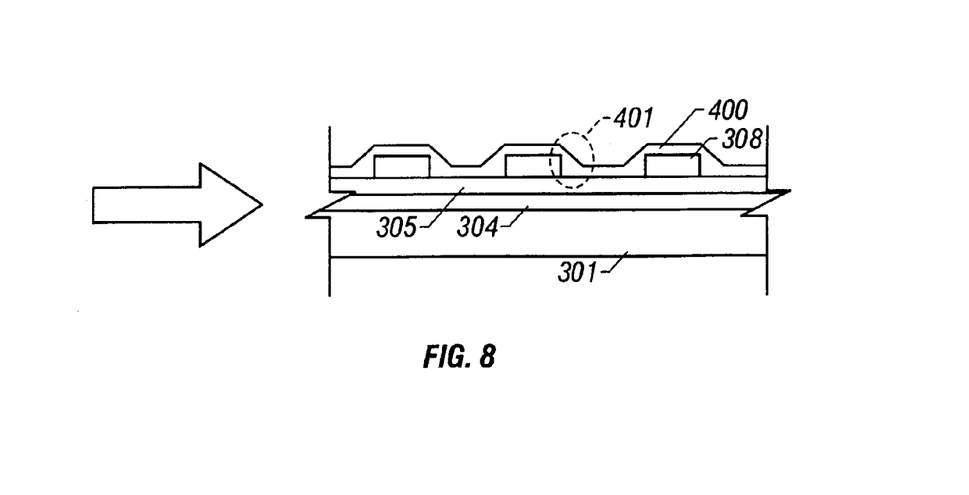
FIG. 8 is a partial sectional view of a liquid crystal panel which utilizes the present invention.

The present embodiment is a device for solving this problem. FIG. 8 shows a section of the region 308 in FIG. 8 as viewed from the righthand side of FIG. 6. The reference numbers in FIG. 8 which are the same as those in FIGS. 6 and 7 designate the same locations.

In the present embodiment, a silicon oxide film 400 is formed by applying a solution after forming the wiring line 308. Such a silicon oxide film has already been put in actual use as a final passivation film or flat film of an integrated circuit.

Figure 9:
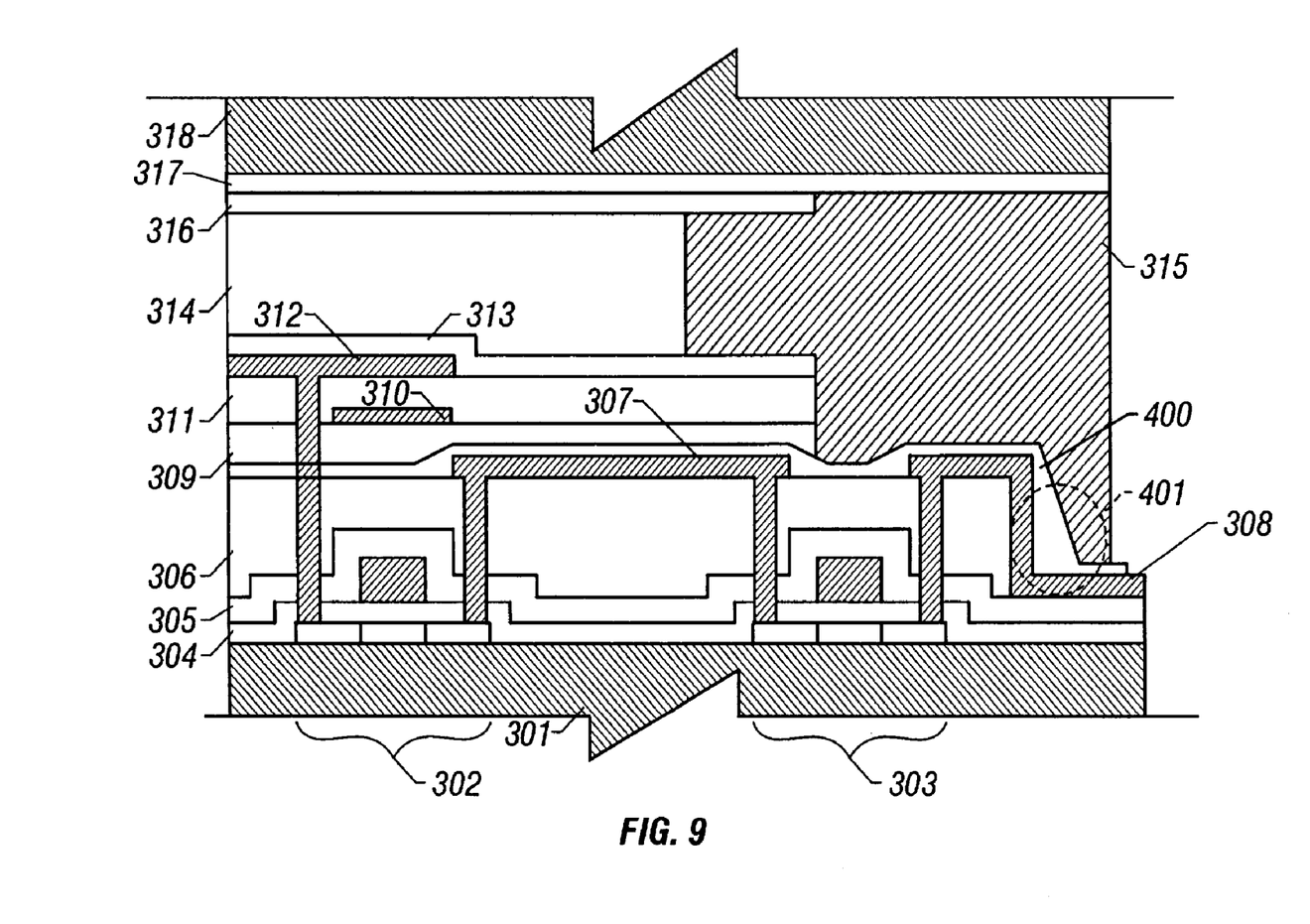
FIG. 9 is a partial sectional view of a liquid crystal panel which utilizes the present invention.

FIG. 9 shows a section as viewed from the right-hand side of FIG. 8. Since a silicon oxide film 400 is formed by applying a solution, a step as indicated by 401 can be filled. This makes it possible to improve the adhesion of the sealing material formed thereon to achieve a preferable sealing function.

As apparent from FIG. 9, it is necessary to remove the silicon oxide film 400 above the end of the line 308 to maintain contact with the outside. FIG. 9 may be regarded as corresponding to FIG. 6.

A fifth embodiment of the present invention will now be described.

The present embodiment relates to a configuration for preventing the breakage and poor conductivity at the line 308 as a result of the application of a stress from the sealing material 315 at the end of the sealing material indicated by 300 in FIG. 6.

The wiring line 308 may be subjected to a stress from the sealing material 315 depending on the type of the epoxy resin that forms the sealing material 315 and hardening conditions for the same, and defects may occasionally occur in the wiring line 308.

Figure 10:
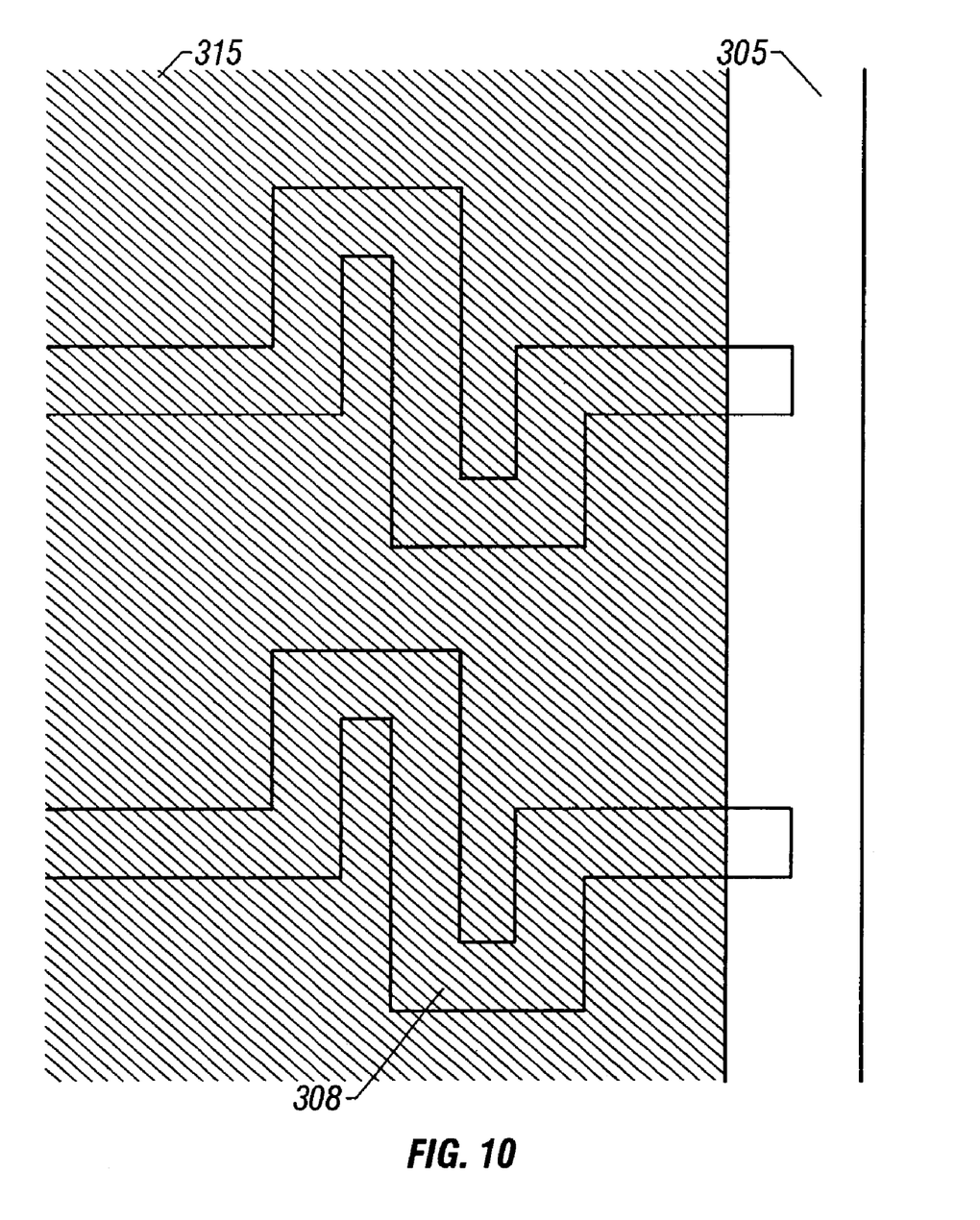
FIG. 10 is a partial sectional view of a liquid crystal panel which utilizes the present invention.

Under such circumstances, according to the present embodiment, the wiring line 308 is patterned as shown in FIG. 10 under the sealing material 315.

This makes it possible to prevent the occurrence of defects at the wiring pattern 308 as a result of the application of a stress from the sealing material 315.

In addition, it is possible to suppress the reduction of sealing properties at side surfaces of the pattern of the wiring line 308 as shown in the fourth embodiment.

A sixth embodiment of the present invention will now be described.

Figure 11A:
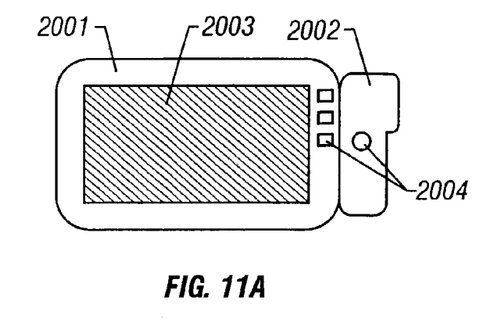
FIGS. 11A through 11F are views schematically showing apparatuses which utilize the present invention.

The present embodiment shows examples of apparatuses having liquid crystal panels as described in the first through fifth embodiments. Configurations as shown in FIGS. 11A through 11F can be used on liquid crystal panels included in such apparatuses. FIG. 11A shows a portable information processing terminal. This apparatus includes a main body 2001 having a display device 2003 utilizing a liquid crystal panel, operation buttons 2004, and a CCD camera 2002. This apparatus has a configuration which allows information to be obtained and transmitted over a telephone network.

As the liquid crystal panel used for the display device, a transmission type or reflection type panel may be used. A reflection type panel is advantageous if power consumption is to be reduced.

Figure 11B:
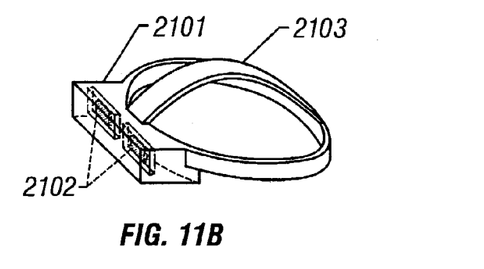

FIG. 11B shows an apparatus referred to as "head mount display" which is put on the head of a user and displays images just in front of the eyes, thereby performing a function of displaying images as if they were real scenes in front of the user. This apparatus includes a liquid crystal display 2102 at a display device portion and has a structure such that a main body 2101 is secured to the head of the user with a band 2103.

As the liquid crystal panel, a transmission type or reflection type panel may be used.

Figure 11C:
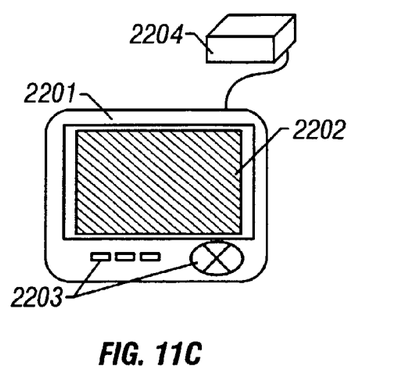

FIG. 11C shows a so-called car navigation system having a main body 2201 on which a display device 2202 utilizing a liquid crystal panel and operation buttons 2203 are provided and has a function of receiving waves from broadcast satellites by an antenna 2204.

As the liquid crystal panel, a transmission type or reflection type panel may be used.

Figure 11D:
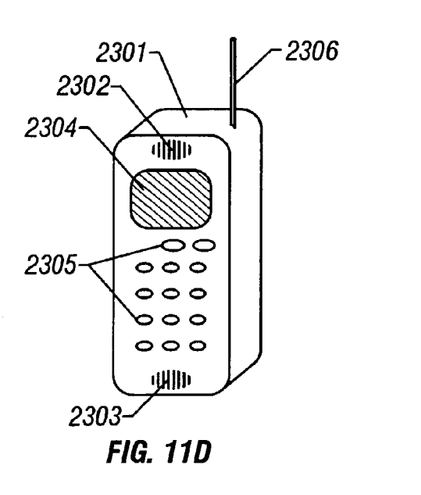

FIG. 11D shows a portable telephone having a main body 2301 on which a display device 2304 utilizing a liquid crystal display, an audio input portion 2303, an audio output portion 2302, operation buttons 2305, and an antenna 2306 are provided.

Figure 11E:
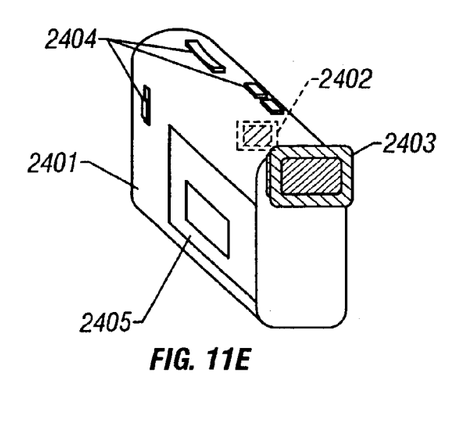

FIG. 11E shows a video camera having a main body 2401 on which operation buttons 2404, a display device 2402 constituted by a liquid crystal display, an eyepiece 2403 for viewing images displayed on the display device 2402, and a tape holder 2405 for containing a magnetic tape for storing photographed images are provided.

As the liquid crystal panel forming the display device 2402, a transmission type panel is normally used which forms images by modulating light from a back-light device.

Figure 11F:
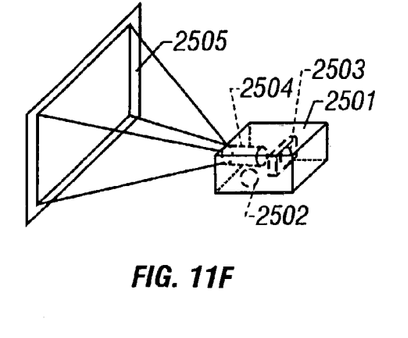

FIG. 11F shows a projection type projector in which a display device 2503 for optically modulating light from a light source is provided at a main body 2501 thereof. The display device 2503 shown in FIG. 11F is a device constituted by a reflection type liquid crystal panel.

An image which has been optically modulated by the display device is magnified by an optical system 2504 and is projected on a screen 2505. An image is viewed from the side of the main body as an image projected on the screen 2505.

The use of the invention disclosed in this specification makes it possible to provide a configuration of an active matrix type liquid crystal display integrated with a peripheral driving circuit in which the surface area excluding the region of a pixel matrix circuit is minimized.

Specifically, by employing a configuration in which a sealing material is provided on a peripheral driving circuit, the surface area excluding a pixel region can be minimized.

Such a configuration further makes it possible to prevent damage to the peripheral driving circuit due to a pressure exerted by the sealing material.

The use of the invention disclosed in this specification makes it possible to prevent moisture from permeating into a thin film transistor circuit and to prevent a stress exerted on a liquid crystal panel from adversely affecting thin film transistors.

Specifically, a configuration can be obtained which prevents thin film transistors from being adversely affected by a stress exerted thereon during the fabrication and handling of s liquid crystal panel and prevents moisture from permeating into the liquid crystal panel.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A display device comprising:
    a thin film transistor formed over a substrate, the thin film transistor comprising an active layer and a gate electrode with a gate insulating film interposed therebetween;
    a silicon nitride film formed over at least the gate electrode;
    a first resin film formed over the silicon nitride film;
    a line formed on the first resin film, and electrically connected to the active layer;
    a second resin film formed over the line; and
    an electrode formed over the second resin film, and electrically connected to the active layer.

2. A display device according to claim 1 wherein the active layer comprises a crystalline silicon film.

3. A display device according to claim 1 wherein the first resin film comprises polyimide.

4. A display device according to claim 1 wherein the second resin film comprises a two-layer structure of polyimide.

5. A display device according to claim 1 wherein the substrate comprises a glass substrate.

6. A display device according to claim 1 wherein the display device comprises a liquid crystal display device.

7. A display device according to claim 1 wherein the display device is incorporated in at least one selected from the group consisting of a portable information processing terminal, a head mount display, a navigation system, a portable telephone, a video camera, and a projector.

8. A display device comprising:
    a thin film transistor formed over a substrate, the thin film transistor comprising an active layer and a gate electrode with a gate insulating film interposed therebetween;
    a silicon nitride film formed over at least the gate electrode;
    a first resin film formed on the silicon nitride film;
    a line formed over the first resin film, and electrically connected to the active layer;
    a second resin film formed over the line; and
    an electrode comprising ITO formed over the second resin film, and electrically connected to the active layer.

9. A display device according to claim 8 wherein the active layer comprises a crystalline silicon film.

10. A display device according to claim 8 wherein the first resin film comprises polyimide.

11. A display device according to claim 8 wherein the second resin film comprises a two-layer structure of polyimide.

12. A display device according to claim 8 wherein the substrate comprises a glass substrate.

13. A display device according to claim 8 wherein the display device comprises a liquid crystal display device.

14. A display device according to claim 8 wherein the display device is incorporated in at least one selected from the group consisting of a portable information processing terminal, a head mount display, a navigation system, a portable telephone, a video camera, and a projector.

15. A display device according to claim 8 wherein the line is in contact with the first resin film.

16. A display device according to claim 1 wherein the line is in contact with the first resin film.

17. A display device comprising:
    a thin film transistor formed over a substrate, the thin film transistor comprising an active layer and a gate electrode over the active layer with a gate insulating film interposed therebetween;
    a silicon nitride film formed over at least the gate electrode;
    a first resin film formed on the silicon nitride film;
    a line formed over the first resin film, and electrically connected to the active layer;
    a second resin film formed over the line; and
    an electrode formed over the second resin film, and electrically connected to the active layer.

18. A display device according to claim 17 wherein the active layer comprises a crystalline silicon film.

19. A display device according to claim 17 wherein the first resin film comprises polyimide.

20. A display device according to claim 17 wherein the second resin film comprises a two-layer structure of polyimide.

21. A display device according to claim 17 wherein the substrate comprises a glass substrate.

22. A display device according to claim 17 wherein the display device comprises a liquid crystal display device.

23. A display device according to claim 17 wherein the display device is incorporated in at least one selected from the group consisting of a portable information processing terminal, a head mount display, a navigation system, a portable telephone, a video camera, and a projector.

24. A display device according to claim 17 wherein the line is in contact with the first resin film.

25. A display device comprising:
    a thin film transistor formed over a substrate, the thin film transistor comprising an active layer and a gate electrode over the active layer with a gate insulating film interposed therebetween;
    a silicon nitride film formed over at least the gate electrode;
    a first resin film formed on the silicon nitride film;
    a line formed over the first resin film, and electrically connected to the active layer;
    a second resin film formed over the line; and
    an electrode comprising ITO formed over the second resin film, and electrically connected to the active layer.

26. A display device according to claim 25 wherein the active layer comprises a crystalline silicon film.

27. A display device according to claim 25 wherein the first resin film comprises polyimide.

28. A display device according to claim 25 wherein the second resin film comprises a two-layer structure of polyimide.

29. A display device according to claim 25 wherein the substrate comprises a glass substrate.

30. A display device according to claim 25 wherein the display device comprises a liquid crystal display device.

31. A display device according to claim 25 wherein the display device is incorporated in at least one selected from the group consisting of a portable information processing terminal, a head mount display, a navigation system, a portable telephone, a video camera, and a projector.

32. A display device comprising:
a thin film transistor formed over a substrate, the thin film transistor comprising an active layer and a gate electrode with a gate insulating film interposed therebetween;
a silicon nitride film formed over at least the gate electrode;
a first resin film formed on the silicon nitride film;
a line formed over the first resin film, and electrically connected to the active layer;
a second resin film formed over the line; and
an electrode formed over the second resin film, and electrically connected to the active layer,
wherein the first resin film extends beyond the second resin film.

33. A display device according to claim 32 wherein the active layer comprises a crystalline silicon film.

34. A display device according to claim 32 wherein the first resin film comprises polyimide.

35. A display device according to claim 32 wherein the second resin film comprises a two-layer structure of polyimide.

36. A display device according to claim 32 wherein the substrate comprises a glass substrate.

37. A display device according to claim 32 wherein the display device comprises a liquid crystal display device.

38. A display device according to claim 32 wherein the display device is incorporated in at least one selected from the group consisting of a portable information processing terminal, a head mount display, a navigation system, a portable telephone, a video camera, and a projector.

39. A display device according to claim 32 wherein the line is in contact with the first resin film.

40. A display device according to claim 25 wherein the line is in contact with the first resin film.

41. A display device comprising:
a thin film transistor formed over a substrate, the thin film transistor comprising an active layer and a gate electrode with a gate insulating film interposed therebetween;
a silicon nitride film formed over at least the gate electrode;
a first resin film formed on the silicon nitride film;
a line formed over the first resin film, and electrically connected to the active layer;
a second resin film formed over the line; and
an electrode comprising ITO formed over the second resin film, and electrically connected to the active layer,
wherein the first resin film extends beyond the second resin film.

42. A display device according to claim 41 wherein the active layer comprises a crystalline silicon film.

43. A display device according to claim 41 wherein the first resin film comprises polyimide.

44. A display device according to claim 41 wherein the second resin film comprises a two-layer structure of polyimide.

45. A display device according to claim 41 wherein the substrate comprises a glass substrate.

46. A display device according to claim 41 wherein the display device comprises a liquid crystal display device.

47. A display device according to claim 41 wherein the display device is incorporated in at least one selected from the group consisting of a portable information processing terminal, a head mount display, a navigation system, a portable telephone, a video camera, and a projector.

48. A display device according to claim 41 wherein the line is in contact with the first resin film.

49. A display device comprising:
a thin film transistor formed over a substrate, the thin film transistor comprising an active layer and a gate electrode over the active layer with a gate insulating film interposed therebetween;
a silicon nitride film formed over at least the gate electrode;
a first resin film formed on the silicon nitride film;
a line formed over the first resin film, and electrically connected to the active layer;
a second resin film formed over the line; and
an electrode comprising ITO formed over the second resin film, and electrically connected to the active layer,
wherein the first resin film extends beyond the second resin film.

50. A display device according to claim 49 wherein the active layer comprises a crystalline silicon film.

51. A display device according to claim 49 wherein the first resin film comprises polyimide.

52. A display device according to claim 49 wherein the second resin film comprises a two-layer structure of polyimide.

53. A display device according to claim 49 wherein the substrate comprises a glass substrate.

54. A display device according to claim 49 wherein the display device comprises a liquid crystal display device.

55. A display device according to claim 49 wherein the display device is incorporated in at least one selected from the group consisting of a portable information processing terminal, a head mount display, a navigation system, a portable telephone, a video camera, and a projector.

56. A display device according to claim 49 wherein the line is in contact with the first resin film.

57. A display device comprising:
a thin film transistor formed over a substrate, the thin film transistor comprising an active layer and a gate electrode with a gate insulating film interposed therebetween;
a silicon nitride film formed over at least the gate electrode;
a first resin film formed over the silicon nitride film;
a second resin film formed over the first resin film;
a line formed between the first resin film and the second resin film, and electrically connected to the active layer; and
an electrode formed over the second resin film, and electrically connected to the active layer.

58. A display device according to claim 57 wherein the active layer comprises a crystalline silicon film.

59. A display device according to claim 57 wherein the first resin film comprises polyimide.

60. A display device according to claim 57 wherein the second resin film comprises a two-layer structure of polyimide.

61. A display device according to claim 57 wherein the substrate comprises a glass substrate.

62. A display device according to claim 57 wherein the display device comprises a liquid crystal display device.

63. A display device according to claim 57 wherein the display device is incorporated in at least one selected from the group consisting of a portable information processing terminal, a head mount display, a navigation system, a portable telephone, a video camera, and a projector.

64. A display device comprising:
a thin film transistor formed over a substrate, the thin film transistor comprising an active layer and a gate electrode with a gate insulating film interposed therebetween;
a silicon nitride film formed over at least the gate electrode;
a first resin film formed over the silicon nitride film;
a second resin film formed over the first resin film;
a line formed between the first resin film and the second resin film, and electrically connected to the active layer; and
an electrode comprising ITO formed over the second resin film, and electrically connected to the active layer.

65. A display device according to claim 64 wherein the active layer comprises a crystalline silicon film.

66. A display device according to claim 64 wherein the first resin film comprises polyimide.

67. A display device according to claim 64 wherein the second resin film comprises a two-layer structure of polyimide.

68. A display device according to claim 64 wherein the substrate comprises a glass substrate.

69. A display device according to claim 64 wherein the display device comprises a liquid crystal display device.

70. A display device according to claim 64 wherein the display device is incorporated in at least one selected from the group consisting of a portable information processing terminal, a head mount display, a navigation system, a portable telephone, a video camera, and a projector.

71. A display device comprising:
a thin film transistor formed over a substrate, the thin film transistor comprising an active layer and a gate electrode over the active layer with a gate insulating film interposed therebetween;
a silicon nitride film formed over at least the gate electrode;
a first resin film formed over the silicon nitride film;
a second resin film formed over the first resin film;
a line formed between the first resin film and the second resin film, and electrically connected to the active layer; and
an electrode formed over the second resin film, and electrically connected to the active layer.

72. A display device according to claim 71 wherein the active layer comprises a crystalline silicon film.

73. A display device according to claim 71 wherein the first resin film comprises polyimide.

74. A display device according to claim 71 wherein the second resin film comprises a two-layer structure of polyimide.

75. A display device according to claim 71 wherein the substrate comprises a glass substrate.

76. A display device according to claim 71 wherein the display device comprises a liquid crystal display device.

77. A display device according to claim 71 wherein the display device is incorporated in at least one selected from the group consisting of a portable information processing terminal, a head mount display, a navigation system, a portable telephone, a video camera, and a projector.

78. A display device comprising:
a thin film transistor formed over a substrate, the thin film transistor comprising an active layer and a gate electrode over the active layer with a gate insulating film interposed therebetween;
a silicon nitride film formed over at least the gate electrode;
a first resin film formed over the silicon nitride film;
a second resin film formed over the first resin film;
a line formed between the first resin film and the second resin film, and electrically connected to the active layer; and
an electrode comprising ITO formed over the second resin film, and electrically connected to the active layer.

79. A display device according to claim 78 wherein the active layer comprises a crystalline silicon film.

80. A display device according to claim 78 wherein the first resin film comprises polyimide.

81. A display device according to claim 78 wherein the second resin film comprises a two-layer structure of polyimide.

82. A display device according to claim 78 wherein the substrate comprises a glass substrate.

83. A display device according to claim 78 wherein the display device comprises a liquid crystal display device.

84. A display device according to claim 78 wherein the display device is incorporated in at least one selected from the group consisting of a portable information processing terminal, a head mount display, a navigation system, a portable telephone, a video camera, and a projector.

* * * * *